United States Patent
Naim et al.

(10) Patent No.: US 6,885,868 B1
(45) Date of Patent: Apr. 26, 2005

(54) FAIR PACKET SCHEDULER AND SCHEDULING METHOD FOR PACKET DATA RADIO

(75) Inventors: Ghassan Naim, Irving, TX (US); Akbar Rahman, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/409,986

(22) Filed: Sep. 30, 1999

(51) Int. Cl.[7] .............................................. H04Q 7/20
(52) U.S. Cl. ............................... 455/452.1; 455/435.3; 455/445; 455/561
(58) Field of Search ................................ 455/445–454, 455/561–562.1, 435.1, 435.3, 524, 525; 379/112.01–112.04, 112.07; 370/230–238, 321, 337, 314, 347

(56) References Cited

U.S. PATENT DOCUMENTS

| | | | |
|---|---|---|---|
| 5,666,655 A | * 9/1997 | Ishikawa et al. | 455/512 |
| 5,742,592 A | 4/1998 | Scholefield et al. | 370/329 |
| 5,862,485 A | * 1/1999 | Linneweh, Jr. et al. | 455/450 |
| 5,914,950 A | * 6/1999 | Tiedemann, Jr. et al. | 370/348 |
| 6,023,230 A | * 2/2000 | Dorenbosch et al. | 340/825.44 |
| 6,035,207 A | * 3/2000 | Wang et al. | 455/509 |
| 6,249,515 B1 | * 6/2001 | Kim et al. | 370/337 |
| 6,282,429 B1 | * 8/2001 | Baiyor et al. | 455/512 |
| 6,366,761 B1 | * 4/2002 | Montpetit | 455/12.1 |

FOREIGN PATENT DOCUMENTS

| | | | |
|---|---|---|---|
| WO | 9700187 | 3/1997 | H04L/12/56 |
| WO | 9800034 | 1/1998 | H04L/12/56 |
| WO | 9807302 | 4/1998 | H04Q/7/22 |
| WO | 9900212 | 3/1999 | H04Q/7/22 |

* cited by examiner

*Primary Examiner*—Charles Craver

(57) ABSTRACT

A method of selecting which one of a number of wireless station is to be allocated a particular transmit opportunity is provided, for example the opportunity to transmit an air interface unit such as a MAC frame. For each wireless station, a transaction length is maintained indicating how many transmit opportunities are required to transmit an upper layer packet to or from the wireless station, and a delay parameter is also maintained for each wireless station indicative of how long since the wireless station was last selected. A group of wireless stations to compete for the right to transmit or receive during the particular transmit opportunity is selected, and for each of the group of the wireless stations, a transmit priority is computed which is a function of transaction length and the delay parameter. Finally, the wireless station in the group of wireless stations with the highest transmit priority is selected as the wireless station to transmit or receive an air interface unit during the particular transmit opportunity. Preferably, the transmit priority is also a function of a wireless station priority for each wireless station.

22 Claims, 5 Drawing Sheets

| AMI | SAP | TR SIZE | NEXT_SLOT | dFr | TIMEOUT VALUE = "a" |
|---|---|---|---|---|---|
| AMI-1 | SAP0 | | | | |
| | SAP1 | | | | |
| AMI-2 | SAP0 | | | | |
| | SAP1 | | | | |
| ⋮ | SAP0 | | | | |
| | SAP1 | | | | |
| AMI-n | SAP0 | | | | |
| | SAP1 | | | | |

FAIR PACKET SCHEDULER AND SCHEDULING METHOD FOR PACKET DATA RADIO

FIELD OF THE INVENTION

The invention relates to schedulers and scheduling methods for delivering packet data radio services.

BACKGROUND OF THE INVENTION

Packet data radio services are becoming increasingly widespread and it is frequently the case that a number of sources are competing for the same opportunity to use an air interface resource. The unit of air interface access might be a MAC (media access control) frame for example, as it is under the rules and regulations of the GPRS-136 standard. In accordance with this standard, packet data messages are transferred on the downlink (base station to mobile station) and uplink (mobile station to base station) over the Packet Control Channel (PCCH). With a well-defined PCCH configuration and multiplexing, the GPRS-136 standard restricts the transmission over the PCCH on a slot reservation basis after an initial contention access; for each MAC frame of a given message, a slot is reserved for its transmission on the air interface.

With the many data transfer applications which may be supported by a single air interface protocol, (E-mail, ftp, web browsing, control messages transparent to the end user etc.) a fair scheduling algorithm for implementation at the base station which organizes the slot reservation process for the concurrent transactions on the uplink and the downlink is required.

While many different scheduling algorithms have been proposed for land-line packet data services, these do not translate well to the wireless environment. For example, round robin scheduling has been investigated, but this proved to result in poor performance due to its lack of consideration for transaction priority, length, and type. Many sources were severely penalized (in terms of delay) by other sources which occupied a large portion of the available limited bandwidth.

A consideration when developing any scheduling algorithm is efficiency since the algorithm needs to be executed each time an air interface unit is to be transmitted. Poor algorithm efficiency leads either to increased complexity being necessary to provide the required speed, or to delays by the scheduler itself.

SUMMARY OF THE INVENTION

It is an object of the invention to obviate or mitigate one or more of the above identified disadvantages.

A simple compact scheduler and scheduling method are provided which are efficient from a processing standpoint, and which are fair to sources having differing characteristics.

A method of selecting which one of a number of wireless stations is to be allocated a particular transmit opportunity is provided, for example the opportunity to transmit an air interface unit such as a MAC frame. For each wireless station, a transaction length is maintained indicating how many transmit opportunities are required to transmit an upper layer packet to or from the wireless station, and a delay parameter is also maintained for each wireless station indicative of how long since the wireless station was last selected. A group of wireless stations to compete for the right to transmit or receive during the particular transmit opportunity is selected, and for each of the group of the wireless stations, a transmit priority is computed which is a function of transaction length and the delay parameter. Finally, the wireless station in the group of wireless stations with the highest transmit priority is selected as the wireless station to transmit or receive an air interface unit during the particular transmit opportunity. Preferably, the transmit priority is also a function of a wireless station priority for each wireless station.

In separate embodiments, a similar method can be applied to scheduling of air interface units from mobile stations to base stations on the forward link, from base stations to mobile stations on the reverse link and to simultaneous forward link and reverse link scheduling.

Preferably, the transmit priority is also a function of how long until each particular wireless station will timeout, and for this purpose, a respective measure of how long since each particular wireless station was last selected is maintained.

Preferably, wireless stations are selected to compete on the basis of their rate. On the basis of each wireless station's rate and possible various other criteria, a next opportunity that each wireless station should compete for is determined.

Preferably, for each wireless station, transmit units are queued in either a respective low priority queue or a respective high priority queue. The group of wireless stations to compete is selected from among those having transmit units in their high priority queue, and if none exist, is selected from the group of wireless stations having transmit units in their low priority queue.

Preferably, the transmit priority is calculated according to:

$$P_{transmit} = \begin{cases} -1 & dFr > a \\ \text{Highest} & dFr = a \\ \left(\frac{dFr}{trSize}\right)\left(1 + \left[\frac{1}{a - dFr} - \frac{1}{a}\right]\alpha\right) + MS \text{ Priority} & dFr < a \end{cases}$$

where:
  trSize is the transaction size;
  dFr is a delay parameter;
  "a" is a timeout value for a given wireless station which indicates a maximum allowable time which can elapse before the next transmission of a transmit unit for the wireless station;
  MSPriority is any suitable definition of wireless station priority;
  α is an accelerator factor towards a higher priority for a given wireless station that has not been selected for a while.

Preferably, wireless stations have timeout values which are selected such that the wireless stations do not timeout during reserved slots.

When applied to reverse link communications, preferably, transmit opportunities are periodically reserved for contention access by new mobile stations, the reserved transmit opportunities being unavailable for selection for transmission by one of the mobile stations already having active communications.

Other embodiments of the invention provide a base station, a base station controller and a MAC layer device adapted to implement one of the above described scheduling methods. Yet another embodiment provides an article of manufacture having a computer usable medium having computer readable program code means embodied therein for causing a scheduling function to be implemented when executed by a computer (equivalently any suitable processing platform).

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
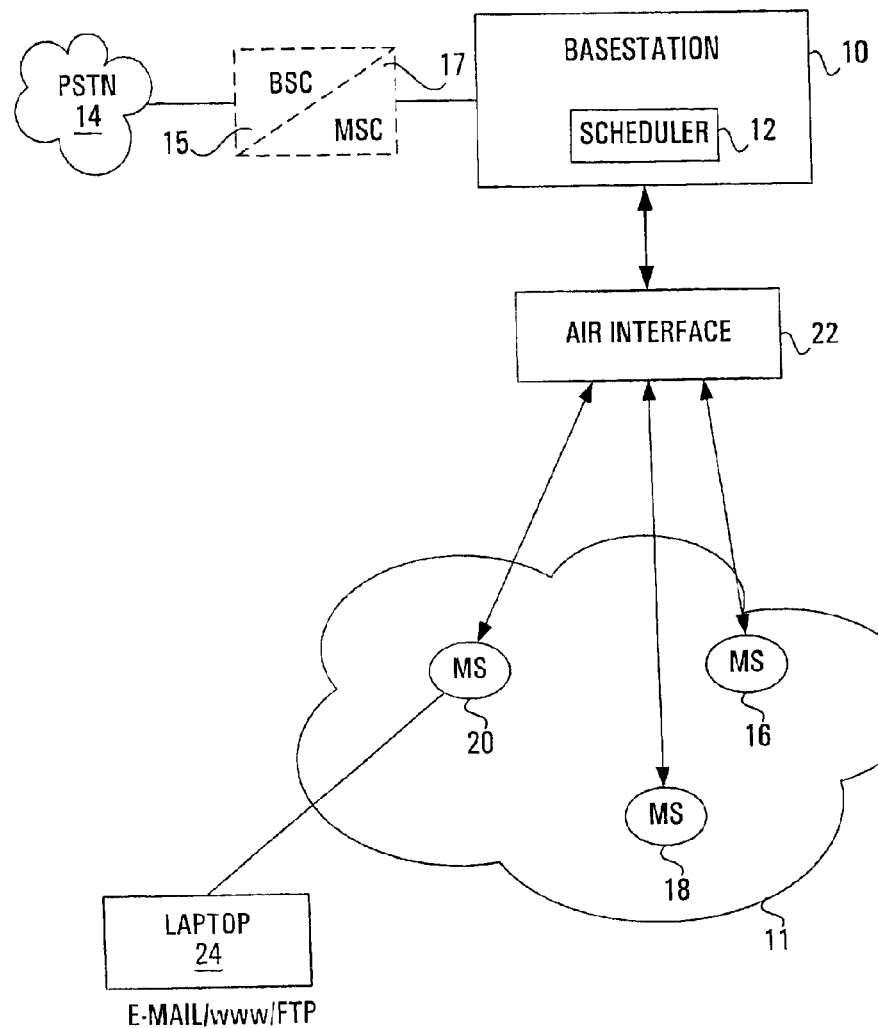
FIG. 1 is a block diagram of a context for applying the scheduler and scheduling method according to embodiments of the invention.

A context diagram for the invention is shown in FIG. 1 in which a base station 10 equipped with the inventive scheduler 12 is shown connected to a network such as the PSTN (public switched telephone network) 14, possibly through a BSC (base station controller) 15 and/or an MSC (mobile station controller) 17 and to a plurality of mobile stations (three shown) 16,18,20 located within the coverage area 11 of the base station 10 through wireless links illustrated by an air interface 22. Each mobile station 16,18,20 represents a point of access for one or more services over a reverse link, and may represent a destination for one or more services over a forward link, the reverse link direction being from a mobile station to a base station and the forward link direction being from a base station to a mobile station. For example one particular mobile station 20 is shown providing an access point for three separate services consisting of E-mail, www, and FTP from a laptop 24.

Referring again to FIG. 1, forward link communications are those from the base station 10 to the mobile stations 16,18,20, and similarly reverse link communications are from the base station 10 to the mobile stations 16,18,20. While the invention can be employed on both directions, it will first be described as it applies to forward link communications.

For the purpose of example only, it is assumed that a GPRS-136 air interface protocol is employed. It is to be understood that embodiments of the invention can be utilized in other environments as well. Access to the air interface is provided on a TDMA (time division multiple access) basis in units of MAC (media access control protocol) frames. More generally, access would be provided in the air interface units of any suitable protocol.

Figure 2:
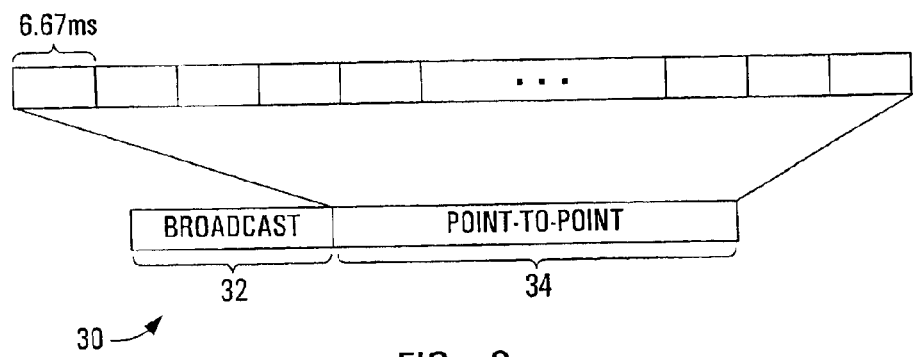
FIG. 2 is an example of a transmit frame structure.

The base station 10 has a superframe structure it uses for the transmission of MAC frames. The superframe structure consists of a series of individually allocatable slots. For the purpose of this invention, the particular superframe slot structure is not important other than to note that there may in some cases be slots within the superframe which are available for point-to-point transmission to individual mobile stations 16,18,20, and there will be slots within the superframe which are not available for point-to-point transmission. Referring to FIG. 2, for the purpose of the GPRS-136 example, each superframe 30 has a structure consisting of a contiguous block 32 of N reserved slots (reserved for broadcast transmission in the case of GPRS-136) followed by a contiguous block 34 of M slots available for point-to-point transmission. Each slot is 6.67 ms in duration.

Figure 3:
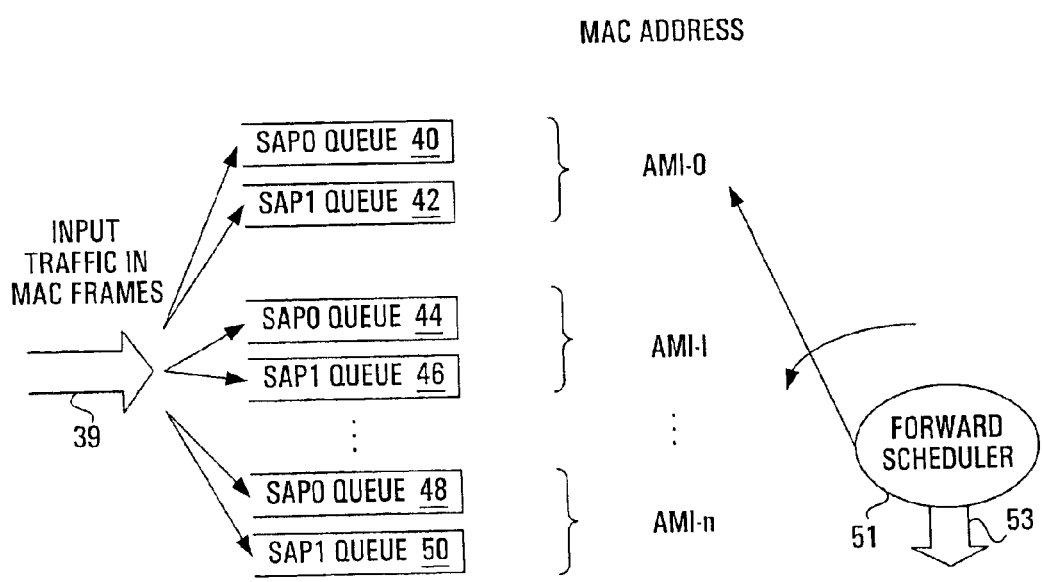
FIG. 3 is a block diagram of an apparatus for forward link queueing and scheduling.

A preferred forward queueing and scheduling structure is illustrated conceptually in FIG. 3. Traffic destined for any of the mobile stations is first converted to MAC frames with all MAC frames thus produced being illustrated symbolically by input traffic in MAC frames 39 which is then queued on a per mobile station basis in one of two queues for each mobile station. More particularly, upper layer packets destined to a given mobile station arrive in accordance with a higher layer protocol (these might be PDUs (packet data units) for example), and these will be converted into one or more MAC layer frames. For each mobile station, preferably multiple queues of different priority are maintained. Preferably, two such queues are maintained for each mobile station one of which is a high priority queue and one of which is a low priority queue. The high priority queue will be referred to as a SAP0 (service access point 0) queue and the low priority queue will be referred to as a SAP1 (service access point 1) queue. The distinction between the two queues for a given mobile station is that SAP0 is reserved for higher priority traffic for the particular mobile station, for example control information. Thus, a high priority upper layer packet has its MAC frames queued in the SAP0 queue, while a regular priority upper layer packet has its MAC frames queued in the SAP1 queue. The priority of a given upper layer packet might be indicated by a priority bit for example. Each mobile station is assigned a MAC address at least for the duration of the MAC layer transaction, this simply being an identifier of the mobile station for the purpose of the air interface scheduling. For the particular case of GPRS-136, the MAC address is the AMI (active mobile identity) and will be referred to as AMI-0 through AMI-n for active mobile stations where it is assumed that there are n+1 active mobile stations. An "active mobile station" is one for which a MAC layer transaction is ongoing. A MAC layer transaction starts when the transmission of MAC frames for a new upper layer packet begins, and terminates when the transmission of the MAC frames for the upper layer packet has completed. Preferably, the AMI is deallocated when the transaction terminates. In this event, a new (not necessarily different) AMI is assigned for the MAC frames of the next upper layer packet. Upper layer transactions are differently defined, but this is not important for the purpose of this invention.

In FIG. 3, the various queues are illustrated with the priority (SAP0 or SAP1) indicated and with the MAC address (AMI for this case) indicated. Thus in the illustration of FIG. 3, there are SAP0 and SAP1 queues 40,42 for a first mobile station having MAC address AMI-0, there are SAP0 and SAP1 queues 44,46 for a second mobile station having MAC address AMI-1 and so on for each of the n+1 mobile stations concluding with the SAP0 and SAP1 queues 48,50 for the n+1th mobile station.

Each time a new upper layer packet is loaded into a queue for a particular mobile station the original size of the upper layer packet in units of MAC frames is determined and stored in association with the upper layer packet, this being referred to as trSize, or transaction size for the upper layer packet.

A forward scheduler 51 performs scheduling to determine which mobile station is to be given the opportunity to transmit, preferably on an AMI basis. At every point-to-point slot in the downlink (thus, not for the reserved slots) a set of mobile stations are selected to compete for transmitting a MAC frame preferably by selecting AMIs. Based on a dynamically changing priority calculated for each selected mobile station by a formula in the scheduling algorithm presented below, the mobile station with the highest priority is selected and the next MAC frame queued for that mobile station is transmitted. The result is a continuous stream 53 of MAC frames transmitted by the base station to the mobile stations.

Figure 4A:
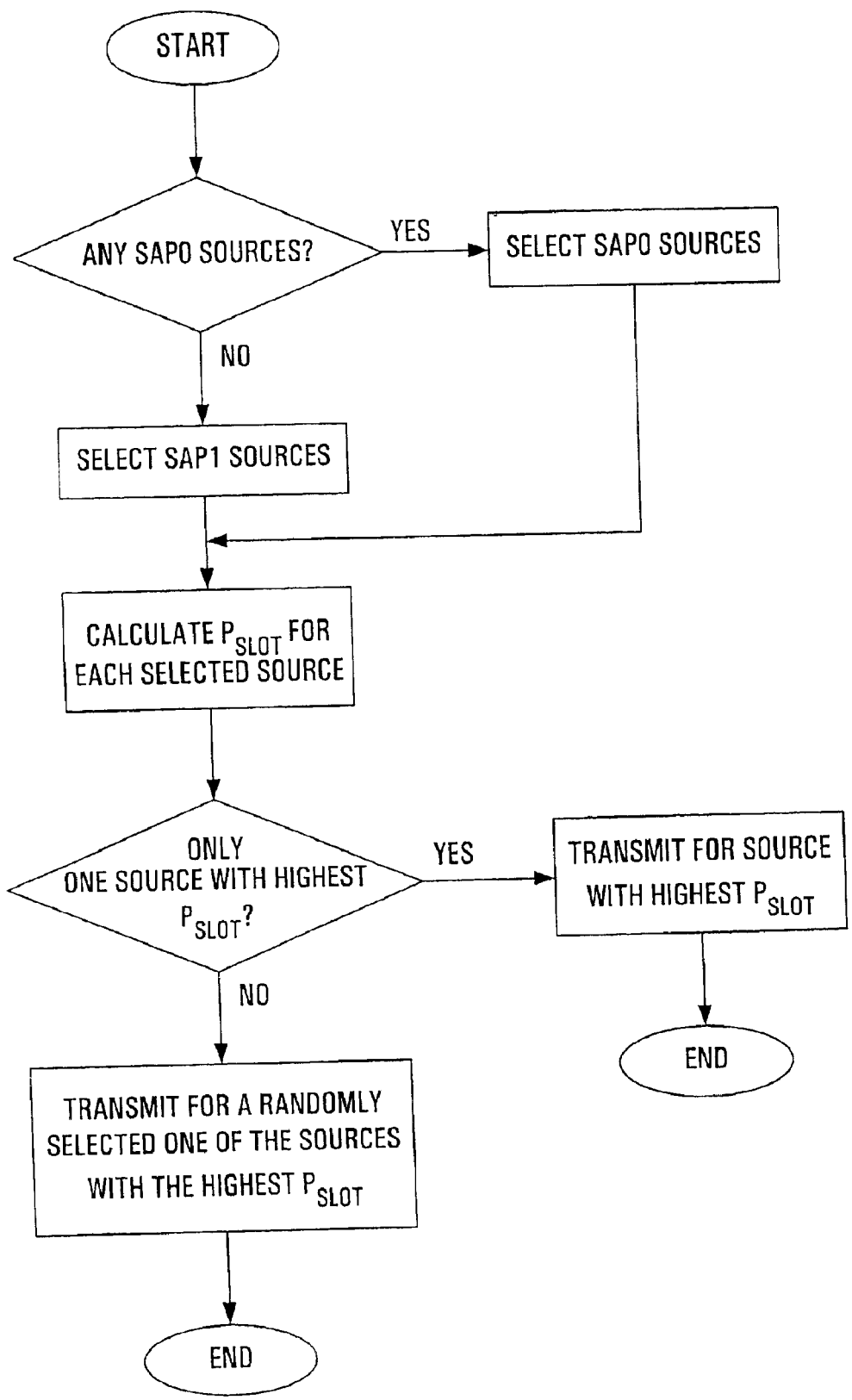
FIG. 4A is a flowchart for the operation of the forward scheduler of FIG. 3.

The algorithm implemented by the forward scheduler 51 in simplified form is summarized in the flowchart of FIG. 4 which in pseudocode can be written as follows:

```
For (slot 1 to infinity slot)
   If any SAP0 mobile stations
      selected mobile stations = SAP0 mobile stations
   Else
      selected mobile stations = SAP1 mobile stations
   Endif
   calculate a priority P_slot for each of the selected
      mobile stations
   If only one mobile station has the highest priority,
      Transmit for the mobile station with the
         highest priority
      Else (more than one mobile station has equal highest
         priority)
         Transmit for a randomly selected one of the
            mobile stations with the highest
      priority
   Endif
   update parameters for all mobile stations
End
```

In the preferred embodiment, the priority $P_{slot}$ for each of the selected mobile stations to be allocated an available downlink slot is calculated as follows:

$$P_{slot} = \begin{cases} -1 & dFr > a \\ \text{Highest} & dFr = a \\ \left(\frac{dFr}{trSize}\right)\left(1 + \left[\frac{1}{a-dFr} - \frac{1}{a}\right]\alpha\right) + MS \text{ Priority} & dFr < a \end{cases}$$

where trSize is the above referenced original transaction size in units of MAX frames;

dFr is a "timer" measuring an elapsed time since the previous visit by the scheduler for example in units of MAC frames. It is incremented by 1 after every slot (6.67 ms) at which the owner AMI was not selected to transmit a frame, and is reset to 0 after the owner AMI sends a frame;

"a" is the timeout value for a given AMI which indicates a maximum allowable time which can elapse before the next transmission of a MAC frame for the AMI. The above-identified timer entitled "dFr" is started at the beginning of the transaction (i.e. after an upper layer packet has been converted to MAC frames) and when the timer exceeds the timeout value "a" the transaction is cancelled and the relevant queues flushed. This timer is set at the beginning of the transaction and reset every transmission of a MAC frame for that mobile station. Given that no frames are allowed to be sent on reserved slots, if the timeout value expires on the time of a reserved slot, the timeout value is reduced to the closest applicable slot before the reserved slots. While there is a single timer for each AMI there may be a separate timeout value "a" for different transaction types. For the purpose of definition, "a" will be set to a value "T_AMI" for ARQ transactions (most SAP0 transactions) and to a value "T_INAC" for non-ARQ transactions (most SAP1 transactions);

MSPriority is any suitable definition of mobile station priority. For example, a mobile station priority is currently under study for inclusion in the GPRS-136 standard;

α serves as an accelerator factor towards a higher priority for a given AMI that has not been selected by the scheduler for a while.

In the above equation, a negative value of $P_{slot}$ reflects an expired transaction time. When this occurs, the transaction is cancelled and all the MAC frames are flushed out of the queue.

For dFr=a, the AMI is given the highest priority for the current slot so that it has the highest chance of being selected and so that its timer will likely not expire. If multiple mobile stations have the highest priority, one of these mobile stations is selected randomly, and the remaining mobile stations will timeout.

Under normal conditions, (dFr<a), the algorithm:

calculates priorities which are inversely proportional to trSize and thus will favour shorter transactions; by doing so, short transactions are not heavily penalized by much longer transactions;

calculates priorities which are proportional to delay dFr. This is done to compensate for the above described preferential treatment for short transactions;

calculates priorities having a term directly proportional to the fixed mobile station priority MSPriority; and calculates priorities which are an inversely proportional function of the approach of timeout—as a timeout is approaching for a given AMI, its priority increases.

The above description has focussed on scheduling MAC frames of transactions which are already underway. Typically, a transaction consists of some sort of startup frame (such as a BEGIN frame in GPRS-136) which is an ARQ frame used to initiate a transaction followed by the rest of the transaction which might be non-ARQ. Such a startup frame enters the competition based on the transaction characteristics (length, MSPriority, rate etc.). The rest of the transaction MAC frames do not enter the competition until the corresponding ARQ status frame for the startup frame is received.

From the scheduling perspective, the scheduler is presented from a point of view that all the transactions in the queue structure have already received the ARQ status frame for the startup frame, and are ready to be sent on the downlink.

The above scheduling approach has assumed that every mobile station wants to compete for every transmit slot. More generally, for embodiments where this is not the case for every slot, an AMI is selected to compete based on the previous slot it competed for (whether it won the competition for that slot or not) and various other factors discussed below. This is done by allocating for every AMI a field "next_slot" specifying the next slot number it will compete for. At every slot, the scheduler will select for competition the AMIs having "next_slot" matching the current slot.

The field next_slot is set based on the previous slot the AMI competed for, and other factors such as the AMI rate phase, the point in the transmit frame vis a vis broadcast vs. point-to-point slot availability, and subchannels. The GPRS-136 standard defines the criteria for determining the next slot available for a given mobile station.

Figures 4B, 5:
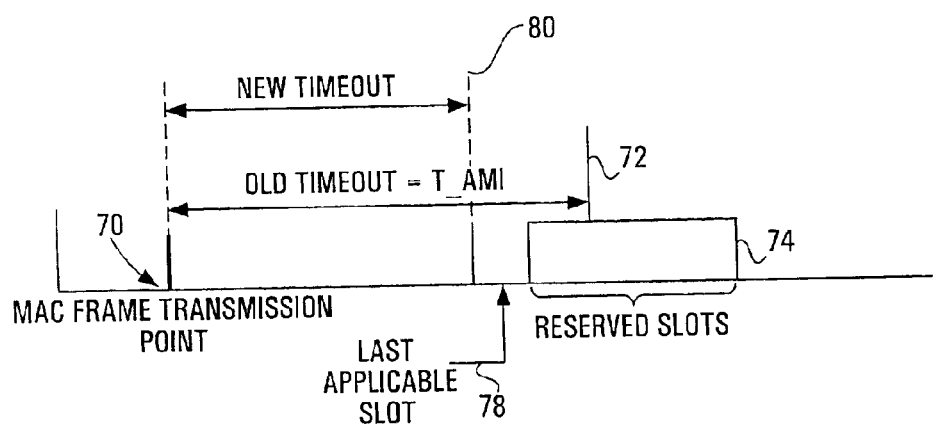
FIG. 4B is a data structure maintained and used by the forward scheduler of FIG. 3.
FIG. 5 is a timing diagram for timeout value setting by the forward scheduler of FIG. 3.

FIG. 4B is an example of a data structure maintained by the scheduler with example contents. The structure includes a record for each AMI 60, AMI-1 through AMI-n for our example. Each record has a TrSize field 64 for each SAP 62, in our case SAP0 and SAP1, and has a next_slot field 66. The next_slot field is filled with data providing a mechanism for determining when to next compete for a slot. This might for example indicate a slot within a 32 superframe cycle, or might indicate how many slots are left until it should compete again. There is a field representing the timeout value, "a" for the current transaction. This may be a different value for the SAP0 transaction than the SAP1 transaction, set to T_INAC for a non-ARQ transaction and to T_AMI for ARQ transaction, subject to the location of reserved slots as discussed below. There is a field 68 for the dFr for each AMI, identifying how long since the AMI was selected for transmission.

When a particular AMI wins the competition, its dFr is set to 0. Otherwise, its dFr is incremented by 1. If more than one AMI has the highest priority, a random one is selected.

SAP0 transactions always take priority over SAP1 transactions. Thus, if a SAP0 MAC frame is encountered in a SAP0 queue of an AMI already in process of transmitting a SAP1 transaction, the SAP1 transaction is put on hold (by not selecting it), and the SAP0 is activated with a new expiry time defined for SAP0 frames, and this AMI will be selected for all applicable upcoming slots until all SAP0 frames are transmitted. During this process, if the AMI is full or double rate, the slots unmatching this AMI rate will be used by other AMI's of matching rate in accordance with the values of "next_slot" for the various mobile stations.

Typically, the expiry time of a SAP0 transaction is small (smaller than that for SAP1 transactions) and may in fact be shorter than the duration of a contiguous block of reserved slots. If this is the case, if a SAP0 transaction is selected to start transmitting towards the end of the current superframe, its timeout value may fall in one of the reserved slots of the next superframe. This will occur if the number of valid time slots left in the current superframe is less than the number of MAC frames required for the transaction. If the AMI was full rate, this may lead to the cancellation of the SAP0 transaction. To avoid this, before activating the SAP0 transaction, the scheduler should check if the reserved slots will interfere with the transaction expiry time of any of the SAP0 slots for the transaction. If so, the SAP0 transaction should be postponed in its entirety until the next superframe. In this case a lower priority SAP0 transaction can be selected, or if none is available, the highest priority SAP1 MAC frame can be transmitted.

For concurrent SAP0 transactions with different AMI's competing for the same slot, the AMI priority $P_{slot}$ is calculated using each SAP0 transaction length and expiry time and the AMI with the highest priority is selected.

An AMI with SAP0 transactions will be favoured over any other AMI with SAP1 transactions when competing for a given slot.

While for the most part, "a" is fixed, it may be reset for a given AMI at the base station after the transmission of a MAC frame. If the expiry time lies in the reserved slots, it is preferably reduced to the closest applicable slot (as defined by the rate, phase etc) before the reserved slots. This is illustrated in FIG. 5 where time 70 represents the previous MAC frame transmission point for that mobile station, and time 72 is the time which would normally result in a timeout occurring, for example after the "old timeout"=T_AMI MAC frames after time 70. In this example, there is a block of reserved slots 74, so a new timeout 80 is provided which has been reduced to the last applicable slot 78 prior to the block of reserved slots 74.

For ARQ transactions, all un-acknowledged frames are repositioned at the head of the queue and the acknowledged ones are removed from the queue. The AMI will remain active until all the frames (SAP0 and SAP1) for the current transactions are removed from the queue.

Uplink Scheduling Algorithm

Figure 6:
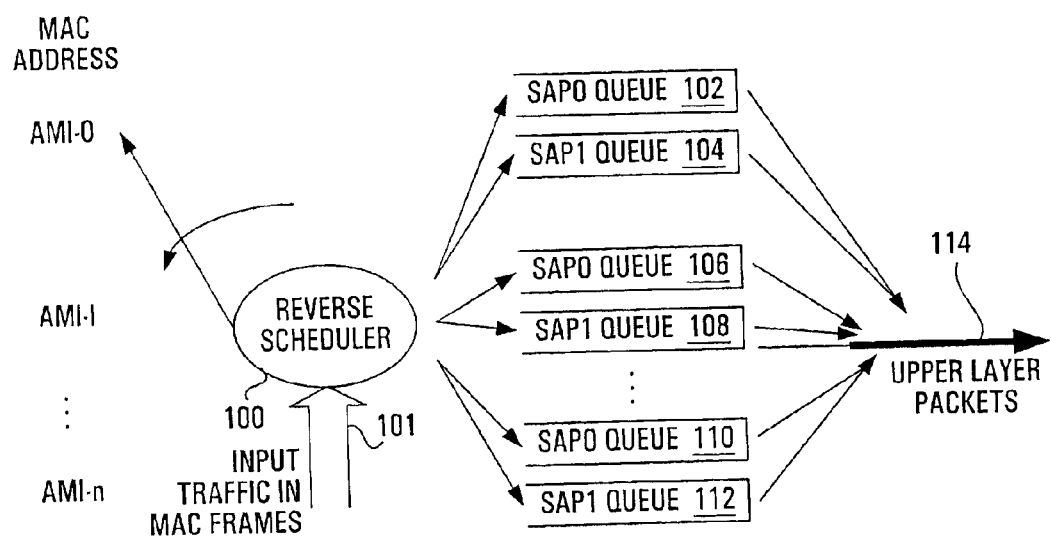
FIG. 6 is a block diagram of an apparatus for reverse link queueing and scheduling.

The same algorithm as in the forward link as described above is used for scheduling the transmission of packets on the reverse link except that preferably several additional constraints are considered which will be explained below. The reverse queueing and scheduling structure at the base station is illustrated in FIG. 6. A reverse scheduler 100 selects an AMI (one of AMI-0 through AMI-n) for reverse link transmission in accordance with the above described scheduling algorithm. Scheduling an AMI for reverse link transmission consists of identifying the AMI in an overhead portion of a previous downlink slot. In GPRS-136, this overhead portion may be the PCF (packet channel feedback). All mobile stations examine these overhead portions to determine when they are allocated access to the forward link channel usually for some selected slot in the very near future. When a mobile station determines it has been allocated a slot it transmits during the allocated slot a SAP0 frame if it has one and otherwise a SAP1 frame. The result is a continuous stream 101 of forward link MAC frames received by the base station. These are then queued in SAP0 and SAP1 queues 102,104,106,108,110,112 for each AMI (there would be a SAP0 and SAP1 queue for each mobile station), and these queues are serviced using any conventional approach for producing upper layer packets and transmitting them on land lines 114. It is assumed that the scheduler is able to know when a mobile station has MAC frames to transmit, and whether they are SAP0 or SAP1 frames, and what the related transaction sizes are. This information can be conveyed in startup frames transmitted during contention opportunities. Contention opportunities are discussed below.

Now turning to the above referenced constraints, firstly, slots are periodically reserved for contention opportunities on the reverse link. Secondly, slots are periodically reserved on the reverse link for forward link transactions that are in progress. This will provide the mobile station upper layer functions an opportunity to send reverse link data if required (e.g. ARQ status frame).

To incorporate the above constraints, any slot reserved on the reverse link (for either of the two reasons presented above) will not be available for the forward link competing AMIs and dFr will be increased by 1 for all AMI's that were supposed to compete for that slot.

Preferably, the period between which slots are provided for contention opportunities is fixed. However, if it happens that a slot which would normally be dedicated to contention opportunities occurs at the same time that a given AMI has its delay timer dFr equal to its expiry timeout value, the corresponding AMI is preferably given a chance to transmit on the current slot, and the following slot is reserved for contention access meaning that the next contention access slot will occur one period later than normal.

For reservation opportunities on the reverse link for forward link transactions that are in progress, the reverse link scheduler should look at the ARQ status frame timeout at the base station, and reserve the reverse link slot for the ARQ status frame for the AMI when the delay equals the status frame timeout.

Numerous modifications and variations of the present invention are possible in light of the above teachings. It is therefore to be understood that within the scope of the appended claims, the invention may be practised otherwise than as specifically described herein.

For example, while the above described embodiments have assumed that a full duplex link is available to each mobile station, meaning that there is no problem transmitting to the mobile station at the same time as receiving from the mobile station, and that the uplink and downlink scheduling can be done essentially independently, modifications can be made which will allow the scheduler to work in a half duplex environment. Given that a half duplex mobile station cannot receive and transmit at the same time, a coordination between the reverse link and forward link schedulers is required, firstly to coordinate the transmissions of ARQ status frames from the mobile station with respect to a forward link transaction. This scenario can be covered by removing the corresponding half-duplex AMI from competition for the forward link slots that align with the reverse link slots reserved for the ARQ status frame. Secondly, coordination is required when concurrent reverse link and forward link transmissions of two different data streams that belong to the same AMI are ongoing. This requires the introduction of a new priority for the AMI in question to decide which of its transmissions, namely reverse link or forward link, should be allowed next.

While the above described embodiments have dealt with wireless TDMA, more generally, embodiments of the invention are provided which are applicable in any packet radio environment. The only thing which would change is the definition of "transmit opportunity".

Furthermore, while mobile stations have been used in the above examples, more generally wireless stations may be used since they need not necessarily be mobile.

In the above example, a transaction has been defined as the transmission of MAC frames for an upper layer packet, and the transaction length TrSize has been defined as the size of the upper layer packet in MAC frames. More generally, a "transaction" may be any collection of air interface frames (such as MAC frames) waiting for transmission upon which the transaction length is based. Thus, while preferably transactions and transaction lengths are aligned with upper layer packets, in a preferred embodiment this need not be the case.

Furthermore, another embodiment of the invention provides an article of manufacture having computer readable code embodied therein for causing any variant of the above described scheduling methods to be implemented by a computer, a computer for these purposes being any suitable processing platform. Such an article of manufacture having computer readable program code means embodied therein for causing selection of one of a plurality of wireless base stations to be allocated a particular transmit opportunity, the computer readable code means in the article of manufacture might for example have computer readable code means for maintaining a respective transaction length for each wireless station and maintaining a respective delay parameter for each wireless station indicative of how long since the wireless station was last allocated a transmit opportunity, computer readable code means for selecting a group of the wireless stations to compete for the transmit opportunity, computer readable code means for each of the group of the wireless stations, computing a respective transmit priority which is a function of the respective transaction length and the respective delay parameter; and computer readable code means for selecting a wireless station in the group of the wireless stations with the highest transmit priority as the wireless station to be allocated the particular transmit opportunity.

The embodiments of the invention in which an exclusive property or privilege is claimed are defined as follows:

1. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity;

wherein said transmit opportunities are forward link transmit opportunities transmitted by a base station.

2. A method according to claim 1 wherein the transaction length indicates bow many transmit opportunities are required to transmit a respective upper layer packet for the wireless station.

3. A method according to claim 1 wherein said transmit priority is also a function of a wireless station priority for each wireless station.

4. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity further comprising:

maintaining a respective measure of how long since each particular wireless station was last allocated a transmit opportunity;

wherein said transmit priority is also a function of how long until a timeout will occur for the respective wireless station.

5. A method according to claim 4 wherein said transmit priority is also a function of a wireless station priority for each wireless station.

6. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations computing a respective transmit priority which is a function of the respective transaction length and the respective delay parameter; and selecting a wireless station in said group of said wireless stations with the highest transmit priority as the wireless station to be allocated the particular transmit opportunity;

wherein said transmit priority is an increasing function of delay and a decreasing function of transaction length.

7. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity;

wherein said transmit priority is also a function of a wireless station priority for each wireless station;

wherein said transmit priority is an increasing function of delay, a decreasing function of transaction length, and an increasing function of wireless station priority.

8. A method according to claim 4 wherein said transmit priority is an increasing function of delay, a decreasing function of transaction length, an increasing function of wireless station priority, and a decreasing function of how long until a timeout will occur for the respective wireless station.

9. A method according to claim 1 wherein when multiple wireless stations in the group have the highest transmit priority, one of the multiple wireless stations is selected randomly.

10. A method according to claim 1 further comprising:
queueing transmit units destined for each wireless station in at least one respective queue.

11. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity wherein selecting the group of wireless stations to compete comprises:

on the basis of each wireless station's rate, determining a next opportunity that each wireless station should compete for;

selecting the group of wireless stations from among those wireless stations whose rate indicates that should compete for the particular opportunity.

12. A method according to claim 1 wherein selecting the group of wireless stations to compete comprises:

queueing transmit units for each wireless station in either a respective low priority queue or a respective high priority queue;

selecting the group of wireless stations from among those having transmit units in their high priority queue, and if none exist, selecting the group of wireless stations from among those having transmit units in their low priority queue.

13. A method of selecting one of a plurality of wireless stations to be allocated a particular transmit opportunity comprising:

maintaining a respective transaction length for each wireless station and maintaining a respective delay parameter for each wireless station indicative of how long since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity;

wherein the transmit priority is calculated according to:

$$P_{transmit} = \begin{cases} -1 & dFr > a \\ \text{Highest} & dFr = a \\ \left(\frac{dFr}{trSize}\right)\left(1 + \left[\frac{1}{a-dFr} - \frac{1}{a}\right]\alpha\right) + MS \text{ Priority} & dFr < a \end{cases}$$

where:

trSize is said transaction length;

dFr is said delay parameter;

"a" is a timeout value for a given wireless station which indicates a maximum allowable time which can elapse before the allocation of a transmit opportunity for the wireless station;

MSPriority is any suitable definition of wireless station priority;

α is an accelerator factor towards a higher priority for a given wireless station that has not been selected for a while.

14. A method according to claim 1 wherein transmit opportunities are slots transmitted as part of superframes, each superframe containing a plurality of transmit slots available for allocation for transmission by one of said wireless stations, and at least one slot which is reserved, the method further comprising:

setting a timeout value for each wireless station indicating a time before which the wireless station must transmit to avoid causing a timeout;

if a timeout value for a particular wireless station will result in the wireless station timing out during a slot which is reserved, resetting the timeout to occur at a slot available for allocation before the reserved slot.

15. A method of selecting one of a plurality of wireless stations to be allocated a particular transmit opportunity comprising:

maintaining a respective transaction length for each wireless station and maintaining a respective delay parameter for each wireless station indicative of how lone since the wireless station was last allocated a transmit opportunity;

selecting a group of said wireless stations to compete for the transmit opportunity;

for each of the group of said wireless stations, computing a respective transmit priority which is a function of the respective transaction length and the respective delay parameter; and selecting a wireless station in said group of said wireless stations with the highest transmit priority as the wireless station to be allocated the particular transmit opportunity;

wherein said transmit opportunities are reverse link transmit opportunities;

further comprising periodically reserving transmit opportunities for contention access by wireless stations nor currently in competition for transmit opportunities, the reserved transmit opportunities being unavailable for allocation for transmission by wireless stations currently in competition for transmit opportunities.

16. A method according to claim 1 applied simultaneously for forward link and reverse link communication with a respective instance of the method being applied to forward link communications and reverse link communications.

17. A method according to claim 16 further comprising:

reserving reverse link transmit opportunities for wireless stations which are simultaneously involved in reception of forward link traffic.

18. A scheduler operable to implement the method of claim 6.

19. A base station comprising means for implementing the method of claim 6.

20. A base station controller comprising means for implementing the method of claim 6.

21. A MAC layer device comprising means for implementing the method of claim 6.

22. An article of manufacture having computer readable program code means embodied therein for causing selection of one of a plurality of wireless base stations to be allocated a particular transmit opportunity, the computer readable code means in said particle of manufacture comprising:

computer readable code means for maintaining a respective transaction length for each plurality of wireless base station and maintaining a respective delay parameter for each wireless station indicative of how long since the wireless station was last allocated a transmit opportunity;

computer readable code means for selecting a group of said plurality of wireless base stations to compete for the transmit opportunity;

computer readable code means for each of the group of said plurality of wireless base stations, computing a respective transmit priority which is a function of the respective transaction length and the respective delay parameter; and computer readable code means for selecting a wireless base plurality of wireless base stations in said group of said plurality of wireless base stations with the highest transmit priority as the wireless base station to be allocated the particular transmit opportunity.

* * * * *

UNITED STATES PATENT AND TRADEMARK OFFICE
CERTIFICATE OF CORRECTION

PATENT NO. : 6,885,868 B1
DATED : April 26, 2005
INVENTOR(S) : Ghassan Naim et al.

It is certified that error appears in the above-identified patent and that said Letters Patent is hereby corrected as shown below:

Column 10,
Line 24, "...bow..." should read -- ...how... --.

Column 11,
Line 1, "...stations computing..." should read -- ...stations, computing... --.
Line 30, "wherein said transmit priority is also a function of a wireless station priority for each wireless station" should be deleted.

Column 13,
Line 8, "...lone..." should read -- ...long... --.
Line 25, "...nor..." should read -- ...not... --.

Column 14,
Line 14, "...particle..." should read -- ...article... --.
Lines 16-17, "...plurality of wireless base station..." should read -- ...of said plurality of wireless base stations... --.

Signed and Sealed this

Eighteenth Day of April, 2006

JON W. DUDAS
*Director of the United States Patent and Trademark Office*